United States Patent
Lee

(10) Patent No.: US 7,489,311 B2
(45) Date of Patent: Feb. 10, 2009

(54) DRIVING CIRCUIT SYSTEM FOR STEREOSCOPIC IMAGE DISPLAY DEVICE AND DRIVING METHOD THEREOF

(75) Inventor: Tae-Wook Lee, Ulsan (KR)

(73) Assignee: LG Display Co., Ltd., Seoul (KR)

( * ) Notice: Subject to any disclaimer, the term of this patent is extended or adjusted under 35 U.S.C. 154(b) by 249 days.

(21) Appl. No.: 11/172,234

(22) Filed: Jun. 29, 2005

(65) Prior Publication Data
US 2006/0139235 A1    Jun. 29, 2006

(30) Foreign Application Priority Data
Dec. 27, 2004    (KR)    ............. 10-2004-0112667

(51) Int. Cl.
*G06F 3/038* (2006.01)
*G02B 27/22* (2006.01)

(52) U.S. Cl. .................. 345/204; 359/462; 348/42
(58) Field of Classification Search ............ 345/87–100
See application file for complete search history.

(56) References Cited

U.S. PATENT DOCUMENTS 6,285,368 B1 * 9/2001 Sudo ................. 345/419
6,801,242 B1 * 10/2004 Dwyer ................ 348/56
7,085,049 B2 * 8/2006 Hong ................. 359/464
2003/0095117 A1    5/2003 Katagawa et al.
2004/0140985 A1    7/2004 Liaw

FOREIGN PATENT DOCUMENTS

EP    1 087 627    3/2001

OTHER PUBLICATIONS

Office Action dated Aug. 23, 2006 for corresponding German Patent Application No. 10 2005 030 111.8-31.

* cited by examiner

*Primary Examiner*—Duc Q Dinh
(74) *Attorney, Agent, or Firm*—Brinks Hofer Gilson & Lione

(57) ABSTRACT

A driving circuit system for a stereoscopic image display device including a central controlling unit outputting control signals and selection signals according to command signals of an external device, a signal-generating unit outputting driving signals according to the control signals, an output signal-controlling unit receiving the driving signals and outputting the driving signals selected according to the selection signals to a light controlling unit of the stereoscopic image display device, and a connector unit connecting the external device and the light controlling unit.

19 Claims, 8 Drawing Sheets

DRIVING CIRCUIT SYSTEM FOR STEREOSCOPIC IMAGE DISPLAY DEVICE AND DRIVING METHOD THEREOF

The present invention claims the benefit of Korean Patent Application No. 2004-0112667 filed in Korea on Dec. 27, 2004, which is hereby incorporated by reference for all purposes as if fully set forth herein.

BACKGROUND OF THE INVENTION

1. Field of the Invention

The present invention relates to a stereoscopic image display device and more particularly, to a driving circuit unit for a stereoscopic image display device and a driving method thereof

2. Discussion of the Related Art

To provide information accumulated through an information network at high speed, multi-media devices, which are based on digital terminals capable of dealing with letters, sounds and images rapidly, have been researched and developed. Accordingly, a three-dimensional display device has been developed.

In general, the three-dimensional display device displays stereoscopic images using the principle of a stereovision through both eyes. Specifically, parallax between both eyes acts as a primary factor for displaying three-dimensional images. When the right and left eyes look at respective two-dimensional images, the two-dimensional images are transferred to the brain and the brain mixes the two-dimensional images. Thus, a deep and real three-dimensional image is generated.

The above principle is used for three-dimensional display devices displaying three-dimensional images by using two-dimensional images, a stereoscopic display device with specific glasses, a stereoscopic display device without glasses, or a holographic display device. The stereoscopic display device with specific glasses has disadvantages such as inconvenience and unnaturalness due to wearing separate specific glasses. The holographic display device has practicality problems due to using a laser reference beam and a requirement for a large space due to huge equipment. However, the stereoscopic display device without glasses does not require separate specific glasses and its equipment is simple. The stereoscopic display devices without glasses are divided into a parallax barrier type, a lenticular type and an integral photography type. Of these types, presently, the parallax barrier type has been mainly used.

FIG. 1 is a cross-sectional view schematically illustrating a parallax barrier-type stereoscopic image display device according to the related art.

As illustrated in FIG. 1, the parallax barrier type stereoscopic image display device includes a liquid crystal panel 10, a backlight 20 and a parallax barrier 30. The liquid crystal panel 10 includes left-eye pixels L and right-eye pixels R alternating each other. The backlight 20 is disposed at the backside of the liquid crystal panel 10 as a light source and provides light to the liquid crystal panel 10.

The parallax barrier 30 is disposed between the liquid crystal panel 10 and an observer 40. The parallax barrier 30 selectively transmits or blocks light. The parallax barrier 30 includes stripes composed of slits 32 (i.e., transparent portions) and barriers 34 (i.e., opaque portions). The slits 32 and the barriers 34 are alternately arranged such that light from the left-eye pixels L and the right-eye pixels R is selectively transmitted or blocked and thus is provided to left and right eyes of the observer 40.

In the parallax barrier-type stereoscopic image display device, light is emitted from the backlight 20 and is provided to the liquid crystal panel 10. Here, light L1 for the left eye of the observer 40 passes through the left-eye pixels L of the liquid crystal panel 10 and the slits 32 of the parallax barrier 30 to thereby reach the left eye of the observer 40. Meanwhile, light R1 to the right eye of the observer 40 passes through the right-eye pixels R of the liquid crystal panel 10 and the slits 32 to thereby reach the right eye of the observer 40.

Even though it passes through the left-eye pixels L, light L2 for the right eye of the observer 40 is blocked by the barriers 34 of the parallax barrier 30 and does not reach the right eye of the observer 40. Similarly, even though it passes through the right-eye pixels R, light R2 for the left eye of the observer 40 is blocked by the barriers 34 of the parallax barrier 30 and does not reach the left eye of the observer 40.

Accordingly, light passing through the left-eye pixels L reaches only the left eye of the observer 40, and light passing through the right-eye pixels R reaches only the right eye of the observer 40. The observer 40 can see only the light L1 and the light R1. At this time, there is parallax information that the observer 40 may notice between the light L1 and the light R1, and thus the observer 40 can see three-dimensional images.

However, in the parallax barrier-type stereoscopic image display device, since the light L2 and the light R2 are blocked by the barriers 34, a large amount of light is vanished. Therefore, the brightness of the device is decreased.

The parallax barrier-type stereoscopic image display device may have another structure. FIG. 2 is a cross-sectional view schematically illustrating another parallax barrier-type stereoscopic image display device according to the related art. This parallax barrier type stereoscopic image display device switches between two and three-dimensional images.

In FIG. 2, the parallax barrier-type stereoscopic image display device includes a liquid crystal panel 10, a backlight 20 and a parallax barrier 30. The liquid crystal panel 10 includes left-eye pixels L and right-eye pixels R alternating each other. The parallax barrier 30 includes slits 32 and barriers 34 and is disposed under the liquid crystal display device 10. The backlight 20 is disposed under the parallax barrier 30 and emits light toward the parallax barrier 30 and the liquid crystal panel 10. Here, the parallax barrier 30 is disposed between the liquid crystal panel 10 and the backlight 20, and the liquid crystal panel 10 is disposed between the parallax barrier 30 and an observer 40.

Light is emitted from the backlight 20 and passes through the slits 32 of the parallax barrier 30. If the light passing through the slits 32 passes through the right-eye pixels R, the light goes to the right eye of the observer 40. If the light passing through the slits 32 passes through the left-eye pixels L, the light goes to the left eye of the observer 40. In addition, the parallax barrier 30 selectively absorbs and blocks light by the barriers 34 so as to distribute the light emitted from the backlight 20 to the right-eye pixels R and the left-eye pixels L. The parallax barrier 30 may use a liquid crystal panel.

FIG. 3 is a schematic view illustrating a three-dimensional image in a related art parallax barrier type image display device. FIG. 4 is a schematic view illustrating a two-dimensional image in the related art parallax barrier type image display device.

In FIGS. 3 and 4, the parallax barrier type image display device includes a liquid crystal panel 50, and a parallax barrier 60 is disposed under the liquid crystal panel 50. A backlight 70 is disposed under the parallax barrier 60 as a light source.

The liquid crystal panel 50 includes a plurality of pixels. Each pixel includes a thin film transistor and an electrode.

Images are displayed by applying an electric field to liquid crystal molecules in each pixel.

As illustrated in FIG. 3, when the device displays a three-dimensional image, right-eye pixels R and left-eye pixels L are alternately arranged in the liquid crystal panel 50.

The parallax barrier 60 may be a liquid crystal panel including a plurality of pixels. Therefore, when a voltage is applied to the parallax barrier 60, some pixels function as barriers 62 absorbing or blocking light emitted from the backlight 70, and the other pixels function as slits transmitting light. The barriers 62 and the slits alternate each other.

Light emitted from the backlight 70 is divided by the barriers 62 and slits of the parallax barrier 60 and passes through the right-eye pixel R or the left-eye pixel L to thereby reach either the right eye or the left eye of observer 80. Accordingly, an image formed by the right-eye pixels R and the left-eye pixels L is provided to the right and left eyes of the observer 80. Because there exists parallax between lights reaching the right eye and the left eye, a three-dimensional image is observable.

In FIG. 4, a voltage is not applied to the parallax barrier 60, and barriers and slits are not formed in the parallax barrier 60. Every pixel of the parallax barrier 60 transmits light. Therefore, the right-eye pixels and the left-eye pixels are discriminated in the liquid crystal panel 50, and the same images are provided to the right eye and the left eye of the observer 80. Accordingly, a two-dimensional image is displayed.

In the stereoscopic image display device, to display two and three-dimensional images smoothly, response time of the liquid crystal molecules in the parallax barrier should be short.

SUMMARY OF THE INVENTION

Accordingly, the present invention is directed to an interface circuit system for a parallax barrier type stereoscopic image display device and a driving method thereof that substantially obviates one or more problems due to limitations and disadvantages of the related art.

An advantage of the present invention is to provide an interface circuit system for a parallax barrier type stereoscopic image display device and a driving method thereof that make response time of liquid crystal molecules fast.

In another aspect, the present invention is to provide an interface circuit system for a parallax barrier type stereoscopic image display device and a driving method thereof that display clear three-dimensional images without distortion.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

To achieve these and other advantages and in accordance with the purpose of the present invention, as embodied and broadly described, a driving circuit system for a stereoscopic image display device includes a central controlling unit coupled with an external device, outputting control signals and selection signals according to command signals from the external device, a signal-generating unit coupled to the central controlling unit, outputting driving signals according to the control signals from the central controlling unit, an output signal-controlling unit coupled with the central controlling unit and signal-generating unit, receiving the selection signals and the driving signals and outputting the driving signals selected based on the selection signals to a light controlling unit of the stereoscopic image display device, and a connector unit coupling the external device with the light controlling unit.

In another aspect of the present invention, a driving method of a driving circuit system for a stereoscopic image display device includes outputting control signals and selection signals from a central controlling unit according to command signals received from an external device, outputting driving signals from a signal-generating unit to an output signal-controlling unit based on the control signals, and selectively outputting the driving signals from the output signal-controlling unit to a light controlling unit of the stereoscopic image display device based on the selection signals from the central controlling unit.

In another aspect of the present invention, a stereoscopic image display device, includes a light controlling unit comprising a plurality of regions wherein the plurality of regions is further divided into a plurality of sub-regions, an interface circuit that transmits driving signals to the light controlling unit that represent the voltage supplied to each of the plurality of sub-regions, wherein each of the plurality of regions has at least one first sub-region receiving a common voltage and at least one second sub-region receiving a voltage that alternates between two voltage values, and a display coupled with the light controlling unit displaying an image wherein light is transmitted through each of the plurality of at least one first sub-regions and light is blocked by each of the plurality of at least one second sub-regions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the embodiments of the present invention, an example of which is illustrated in the accompanying drawings.

Figure 1:
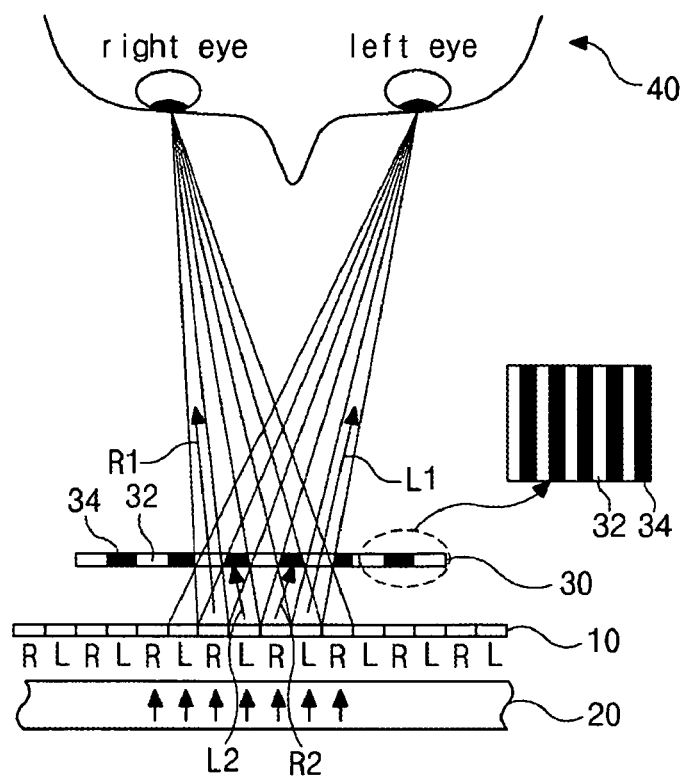
FIG. 1 is a cross-sectional view schematically illustrating a parallax barrier type stereoscopic image display device according to the related art.
Figure 2:
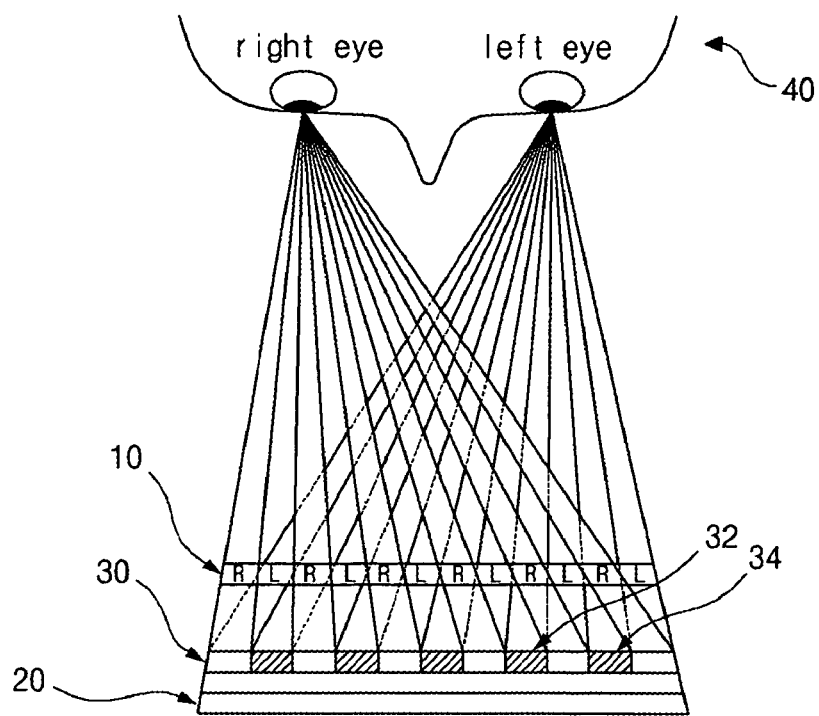
FIG. 2 is a cross-sectional view schematically illustrating another parallax barrier type stereoscopic image display device according to the related art.
Figure 3:
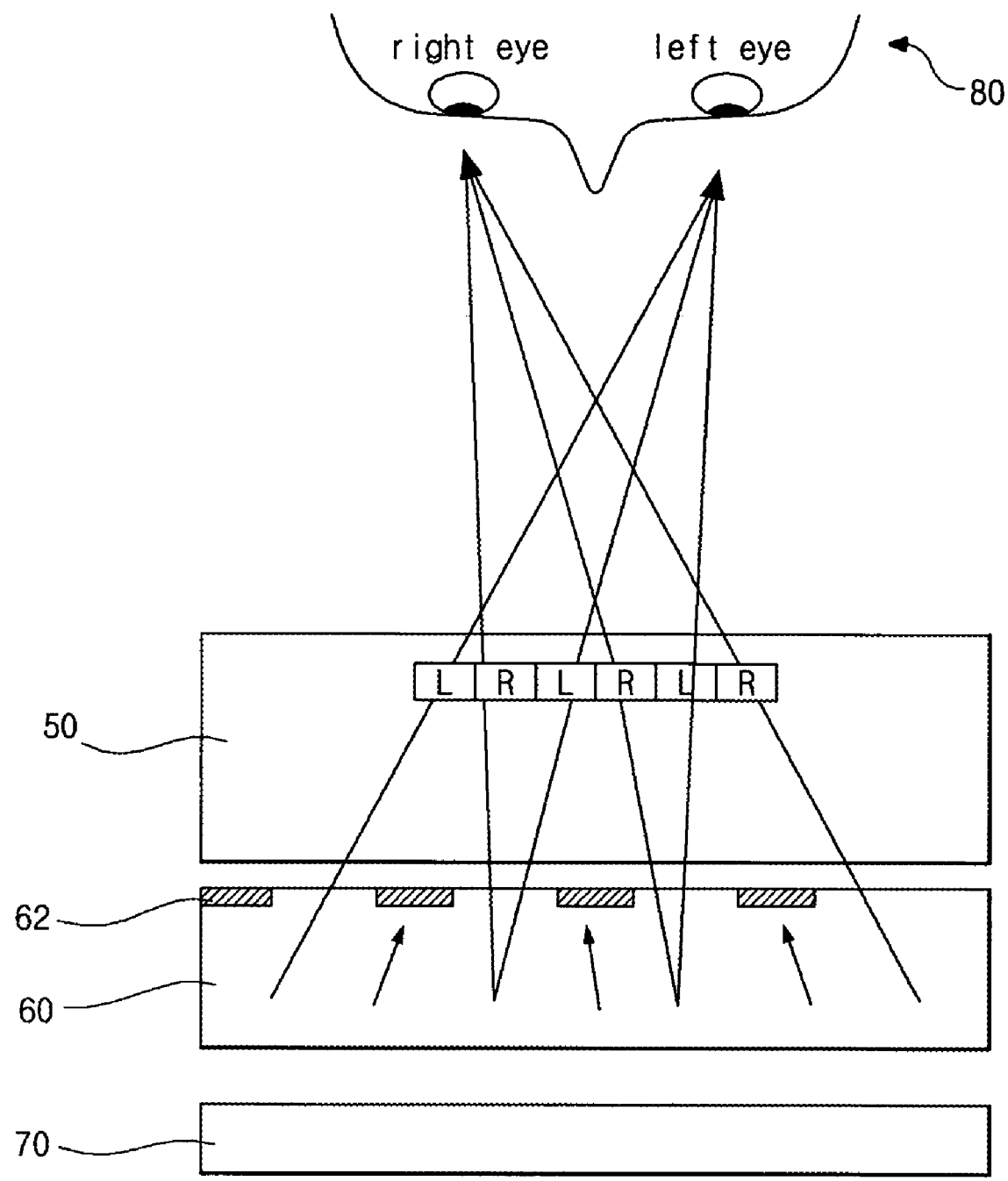
FIG. 3 is a schematic view illustrating a three-dimensional image in a related art parallax barrier type image display device.
Figure 4:
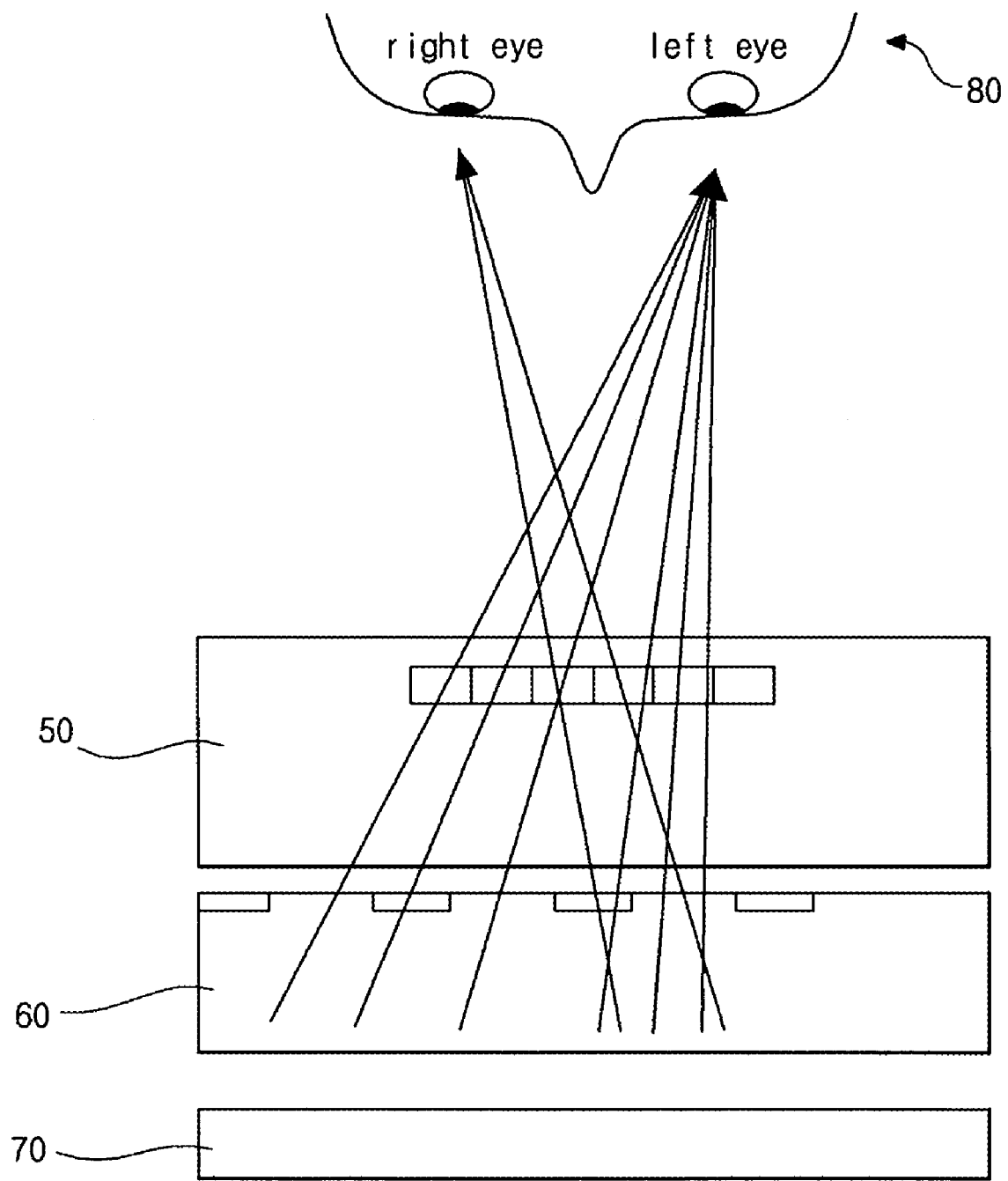
FIG. 4 is a schematic view illustrating a two-dimensional image in the related art parallax barrier type image display device.
Figure 5:
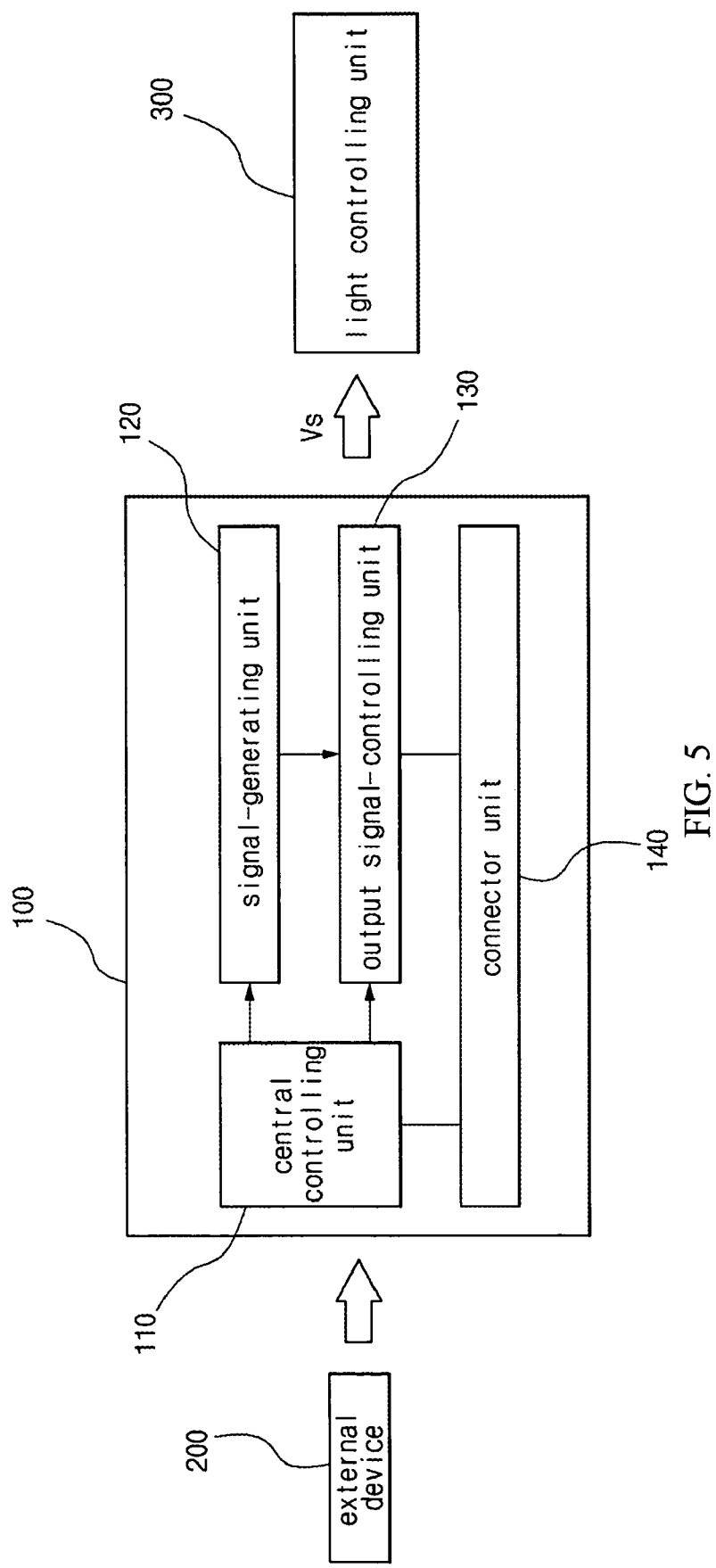
FIG. 5 is a block diagram illustrating an interface circuit system for a parallax barrier type stereoscopic image display device according to an embodiment of the present invention.
Figure 6:
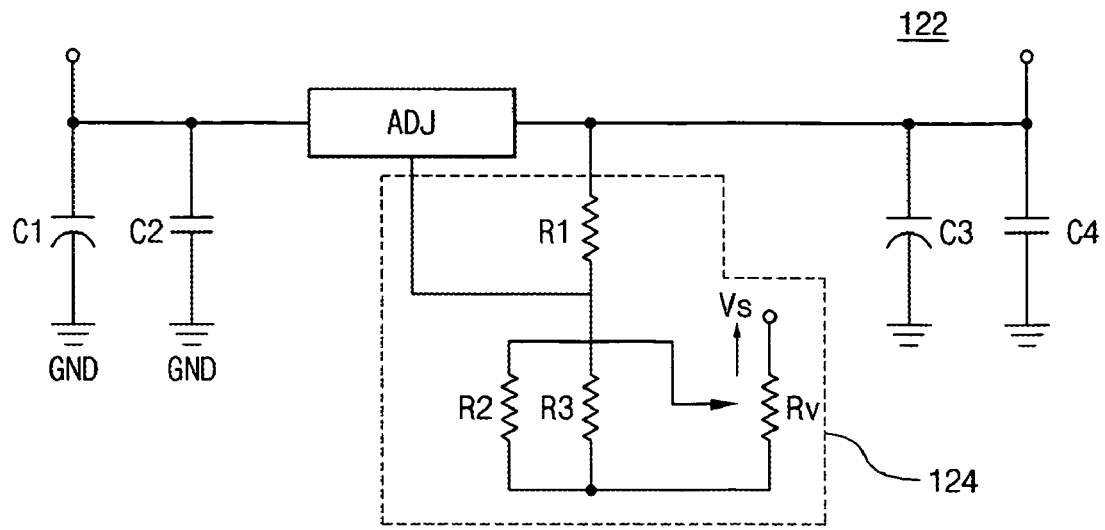
FIG. 6 is a circuit diagram illustrating a regulator according to the present invention.
Figure 7:
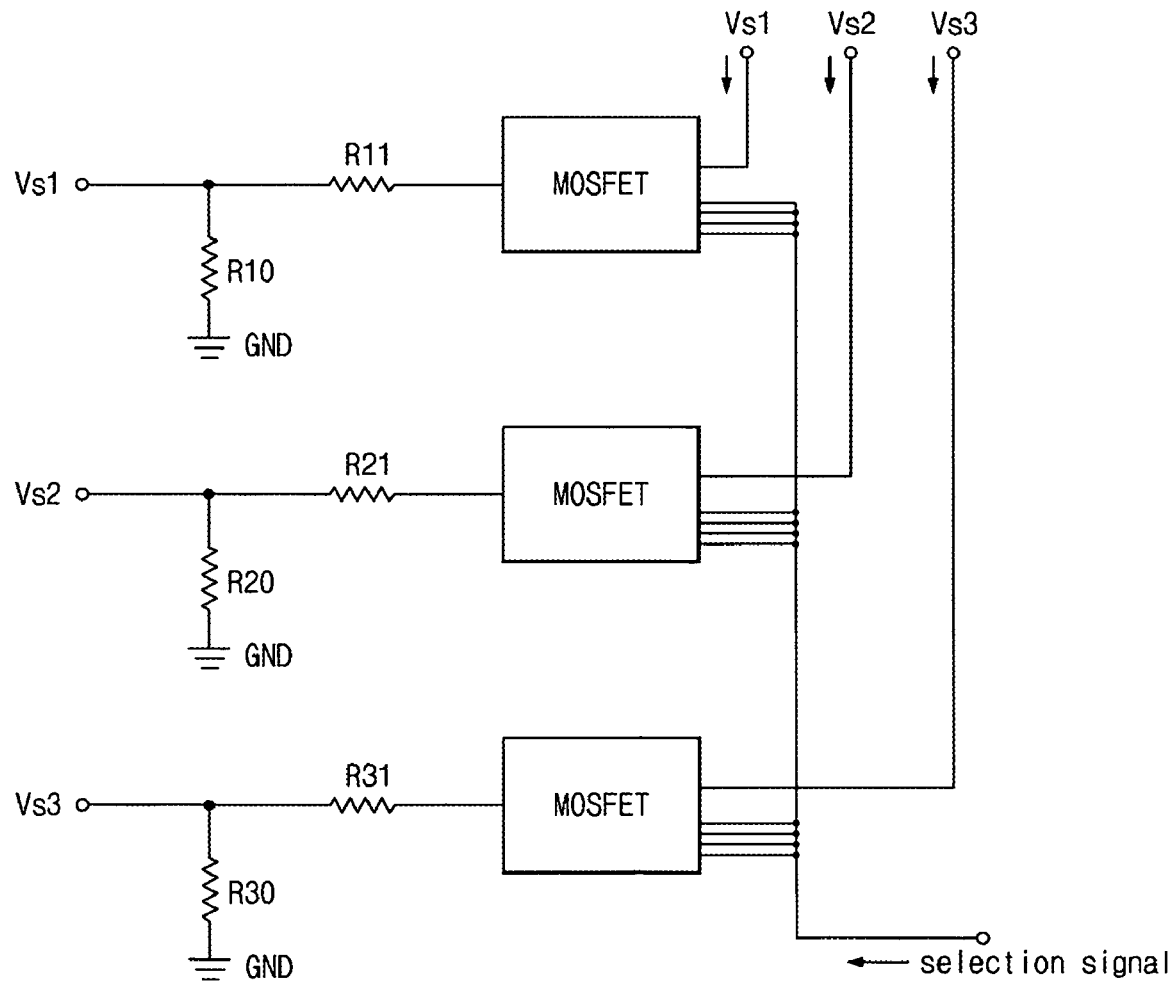
FIG. 7 is a circuit diagram illustrating an output signal-controlling unit according to the present invention.

FIG. 5 is a block diagram illustrating an interface circuit system for a parallax barrier type stereoscopic image display device according to an embodiment of the present invention. FIG. 6 is a circuit diagram illustrating a regulator according to the present invention, and FIG. 7 is a circuit diagram illustrating an output signal-controlling unit according to the present invention.

As illustrated in the figures, an interface circuit system 100 controls a light controlling unit 300 of a parallax barrier type stereoscopic image display device, i.e., a parallax barrier, such as a liquid crystal panel, according to input signals from an external device 200 such as a personal computer. The interface circuit system 100 improves driving the liquid crystal panel by over-driving liquid crystal molecules.

The interface circuit system 100 includes a central controlling unit 110, a signal-generating unit 120, an output signal-controlling unit 130 and a connector unit 140.

The central controlling unit 110, for example, a microcomputer, controls transmitting and receiving signals communicating with the external device 200 and the light controlling unit 300. The central controlling unit 110 also controls generating and outputting command signals such as control signals or selection signals for operating the light controlling unit 300 by decoding commands inputted from the external device 200.

The signal-generating unit 120 generates driving signals Vs for three-dimensionally driving the light controlling unit 300 according to the control signals of the central controlling unit 110. The signal-generating unit 120 includes a plurality of regulators 122, where a regulator 122 is shown in FIG. 6. Each regulator 122 includes a voltage adjusting part ADJ and a voltage level-changing circuit part 124. The voltage level-changing circuit part 124 includes resistances R1, R2 and R3 and a variable resistance Rv. Each regulator 122 further includes four capacitances C1, C2, C3 and C4.

The variable resistance Rv is used for over-driving liquid crystal molecules. The response time of the liquid crystal molecules is quicker by adjusting levels of the driving signals Vs using the variable resistance Rv to thereby achieve fast driving.

Generally, the driving signals are about 7V which is the same as a common voltage Vcom, and the driving signals are applied to regions corresponding to the slits, and driving signals alternating between 1V and 13V are applied to regions corresponding to the barriers to drive the liquid crystal molecules with currents of about 1 A. However, in the present invention, driving signals alternating between 0V and 14V by the regulators 122 including the variable resistances are applied to the regions corresponding to the barriers. Thus, the liquid crystal molecules are driven by currents of about 1.5 A, and the response time of the liquid crystal molecules is faster.

The output signal-controlling unit 130 receives the driving signals Vs outputted from the signal-generating unit 120 and outputs the driving signals Vs selected according to the selection signals of the central controlling unit 110 to corresponding sub-regions. The output signal-controlling unit 130 includes a plurality of MOSFETs (metal-oxide-semiconductor field effect transistors) as shown in FIG. 7.

The connector unit 140 includes a plurality of connectors so that the interface circuit system 100 is electrically connected to the external device 200 and the light controlling unit 300. Two examples of connectors may be USB (universal serial bus) port connectors or FPC (flexible printed circuit) cable connectors.

Figure 8:
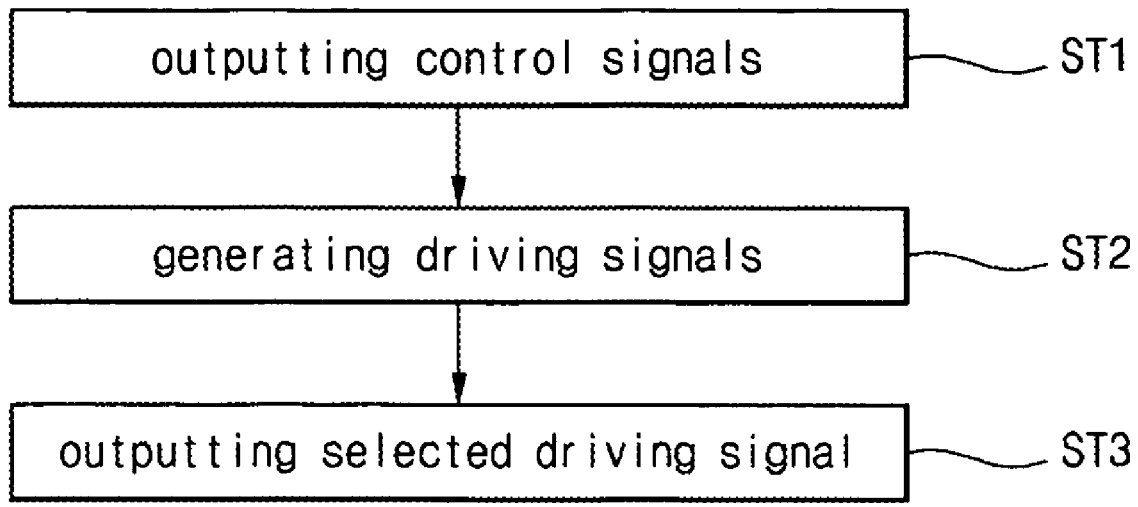
FIG. 8 is a flow chart illustrating a driving method of an interface circuit system for a parallax barrier type stereoscopic image display device according to the present invention.

FIG. 8 is a flow chart illustrating a driving method of an interface circuit system for a parallax barrier type stereoscopic image display device according to the present invention.

At step ST1, the central controlling unit 110 of FIG. 5 outputs control signals, which control generation of driving signals for the light controlling unit 300 of FIG. 5, to the signal-generating unit 120 of FIG. 5 according to signals inputted from the external device 200 of FIG. 5.

At step ST2, the signal-generating unit 120 generates driving signals Vs through respective regulators 122 of FIG. 6 therein. The driving signals Vs may be direct current voltages within a range of about 0V to about 14V. The driving signals Vs for over-driving liquid crystal molecules of the parallax barrier type stereoscopic image display device 200 may be outputted by adjusting the variable resistance Rv of the voltage level-changing circuit part 124 in each regulator 122 of FIG. 6. The driving signals Vs may have values of about 0V, about 7V or about 14V.

At step ST3, the driving signals Vs are inputted to the output signal-controlling unit 130 of FIG. 5. The central controlling unit 110 transmits selection signals to the output signal-controlling unit 130 according to the signals from the external device 200, and the selected driving signals Vs are outputted to sub-regions of the light controlling unit 300 from the output signal-controlling unit 130.

Figure 9:
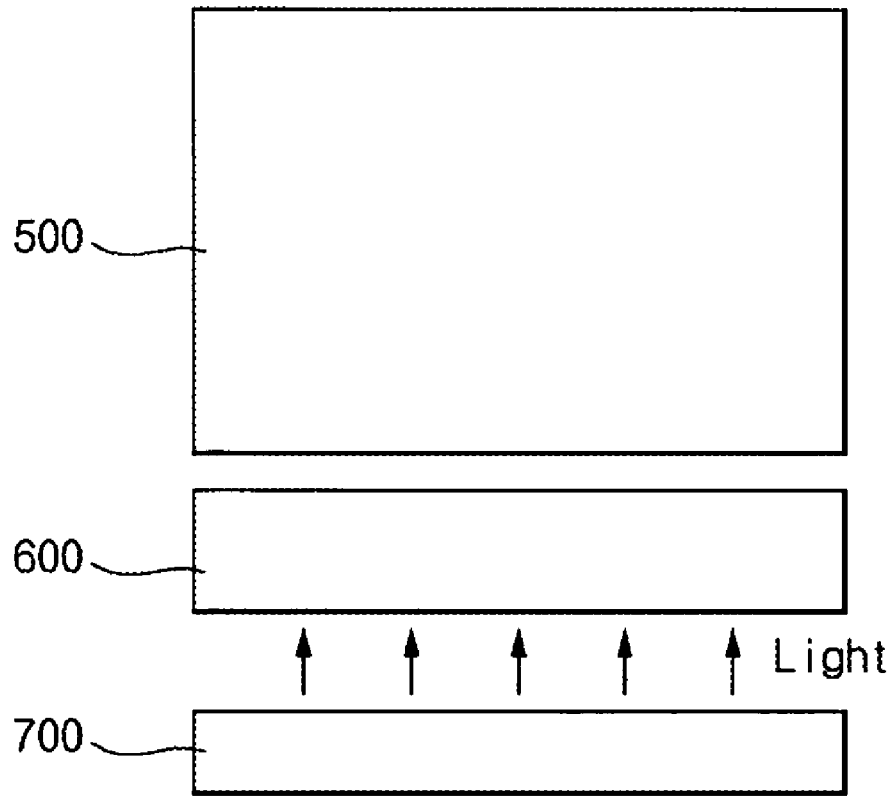
FIG. 9 is a schematic view of a parallax barrier type stereoscopic image display device according to the present invention.

FIG. 9 is a schematic view of a parallax barrier type stereoscopic image display device according to the present invention.

In FIG. 9, the parallax barrier type stereoscopic image display device includes a display panel 500, a light controlling unit 600 and a backlight unit 700. The display panel 500 includes a plurality of pixels for red, green and blue colors and displays an image. The display panel 500 may be a liquid crystal panel. A parallax barrier is used as the light controlling unit 600 for three-dimensional driving, and the light controlling unit 600 is disposed under the display panel 500, i.e., at a backside of the display panel 500. The light controlling unit 600 includes a plurality of portions, wherein some portions function as slits transmitting light and the other portions function as barriers blocking light depending on the voltage that is applied. The slits and barriers are alternately arranged. The light controlling unit 600 may be a liquid crystal panel. The backlight unit 700 is disposed under the light controlling unit 600 and provides light to the display panel 500 and the light controlling unit 600.

Figure 10:
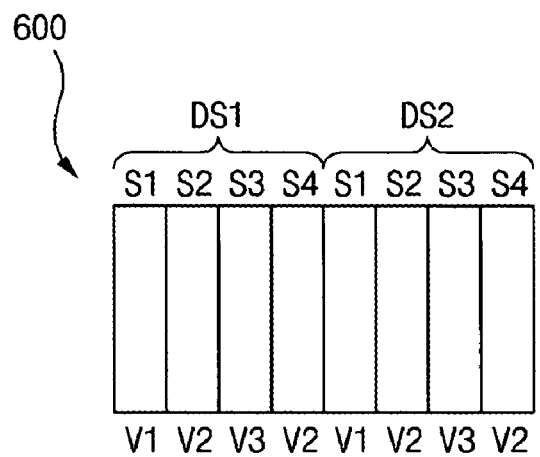
FIG. 10 is a view illustrating driving signals and an operating state of a light controlling unit when a two-dimensional image is displayed using an interface circuit system according to the present invention.
Figure 10:
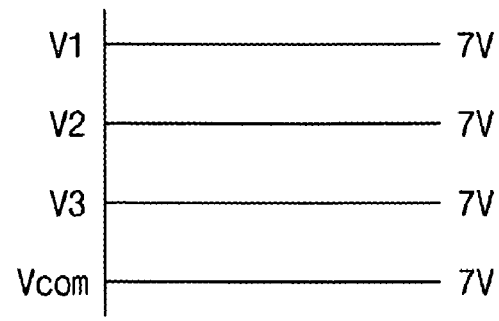

FIG. 10 illustrates driving signals and an operating state of a light controlling unit when a two-dimensional image is displayed using an interface circuit system according to the present invention.

In FIG. 10, the light controlling unit 600 includes a plurality of sub-region groups DS1 and DS2. Each sub-region group DS1 and DS2 is composed of four sub-regions S1, S2, S3 and S4 sequentially arranged. Driving signals V1, V2 and V3 are applied to the light controlling unit 600.

In displaying a two-dimensional image, a common voltage Vcom is used for driving liquid crystal molecules of the light controlling unit 600. The interface circuit system 100 of FIG. 5 applies the driving signals V1, V2 and V3 having the same voltage as the common voltage Vcom, in this example about 7V, to sub-regions S1, S2, S3 and S4 of each sub-region group DS1 and DS2. Barriers are not formed, and the sub-regions S1, S2, S3 and S4 of each sub-region group DS1 and DS2 transmit light. Accordingly, an image due to the display panel 500 of FIG. 9 is recognized by both eyes of an observer, and a two-dimensional image is expressed. Compare this with FIGS. 11A and 11B discussed below where a common voltage is not applied across each of the sub-regions and therefore not all of the sub-regions transmit light.

Figure 11A:
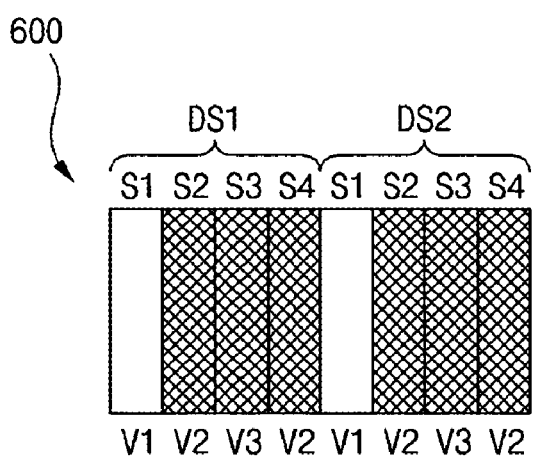
FIGS. 11A and 11B are views illustrating driving signals and an operating state of a light controlling unit when a three-dimensional image is displayed using an interface circuit system according to the present invention.
Figure 11A:
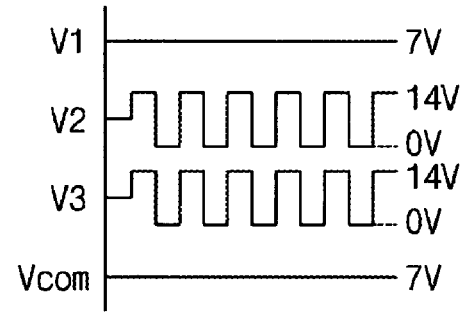
Figure 11B:
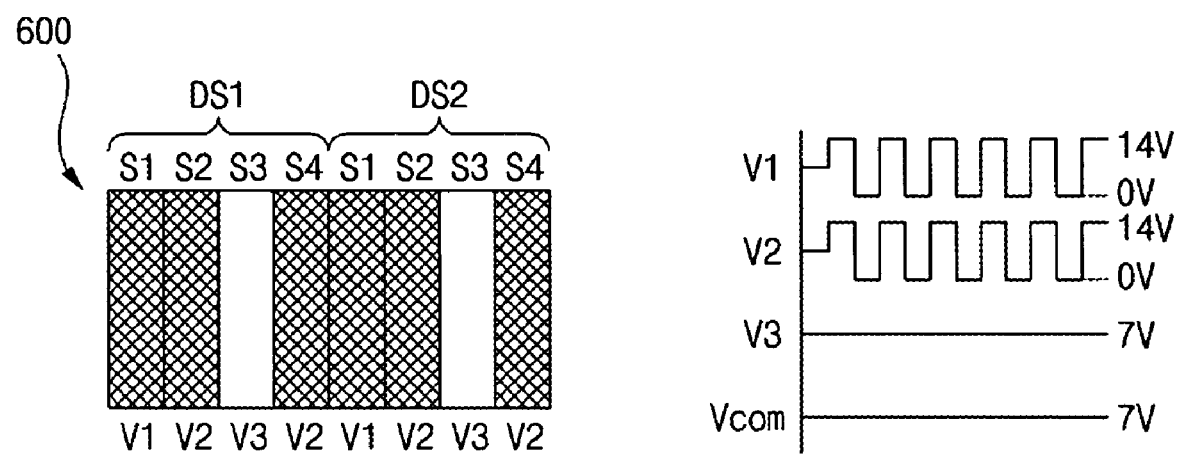

FIGS. 11A and 11B illustrate driving signals and an operating state of a light controlling unit when a three-dimensional image is displayed using an interface circuit system according to the present invention. FIG. 11A corresponds to a left-eye image, and FIG. 11B corresponds to a right-eye image.

To express a three-dimensional image, a right-eye image and a left-eye image are embodied separately. Therefore, as illustrated in FIGS. 11A and 11B, positions of slits and barriers formed in first, second, third and fourth sub-regions S1, S2, S3 and S4 of each sub-region group DS1 and DS2 are continuously changed. In order to display a three-dimensional image smoothly by changing the positions of the slits and barriers very quickly, driving signals for over-driving the liquid crystal molecules are provided using an interface circuit system according to the present invention.

As illustrated in FIGS. 11A and 11B, first, second and third driving signals V1, V2, V3 are applied to the light controlling unit 600 including the sub-region groups DS1 and DS2, each of which is composed of the first, second, third and fourth sub-regions S1, S2, S3 and S4, and the position of slits and barriers is continuously changed to form a right-eye image and a left-eye image.

A common voltage Vcom is about 7V, and one of the first, second or third driving signals V1, V2, V3 has the same level of voltage as the common voltage Vcom. The others of the first, second and third driving signals V1, V2, V3 are over-driven by the signal-generating unit 120 of FIG. 5 of the interface circuit system and have alternating current (AC) voltages alternating between sample voltages, 0V and 14V to prevent degradation of the liquid crystal molecules.

In FIG. 11A, the first driving signal V1 is about 7V in this example, which is the same as the common voltage Vcom. The first driving signal V1 is applied to the first sub-region S1 of each sub-region group DS1 and DS2, and the first sub-region S1 of each sub-region group DS1 and DS2 functions as a slit transmitting light. The second driving signal V2 with AC voltage is applied to the second and fourth sub-regions S2 and S4. The third driving signal V3 with AC voltages is applied to the third sub-region S3. Thus, the second, third and fourth sub-regions S2, S3 and S4 function as barriers blocking light caused by over-driving of the signal-generating unit 120 to have AC voltages.

In FIG. 11B, the third driving signal V3 of about 7V in this example, which is the same as the common voltage Vcom, is applied to the third sub-region S3 of each sub-region group DS1 and DS2. The third sub-region S3 of each sub-region group DS1 and DS2 functions as a slit transmitting light. The second driving signal V2 with AC voltage is applied to the second and fourth sub-regions S2 and S4. The first driving signal V1 with AC voltages is applied to the first sub-region S1. Thus, the first, second and fourth sub-regions S1, S2 and S4 function as barriers blocking light. FIG. 11B has the third sub-region S3 operating as slits for transmitting light while the other sub-regions S1, S2, S4 operate as barriers. Likewise, in FIG. 11A, the first sub-region S1 operated as a slit for transmitting light and the other sub-regions S2, S3, S4 operated as barriers.

The driving of FIGS. 11A and 11B is repeated with a frequency ranging from at least ten to several hundred Hz, and a three-dimensional image is shown due to an optical illusion to both eyes of the observer.

In the present invention, liquid crystal molecules respond fast by using an interface circuit system and a driving method thereof, and thus three-dimensional images are displayed without distortion.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A driving circuit system for a stereoscopic image display device, comprising:
    a central controlling unit coupled with an external device, outputting control signals and selection signals according to command signals from the external device;
    a signal-generating unit coupled to the central controlling unit, outputting driving signals according to the control signals from the central controlling unit;
    an output signal-controlling unit coupled with the central controlling unit and signal-generating unit, receiving the selection signals and the driving signals and outputting the driving signals selected based on the selection signals to a light controlling unit of the stereoscopic image display device;
    a connector unit coupling the external device with the light controlling unit, and
    wherein the signal-generating unit includes at least one regulator having a variable resistance for over-driving liquid crystal molecules of the light controlling unit, wherein the light controlling unit includes a plurality of sub-region groups, each of which includes first, second, third and fourth sub-regions, wherein the first sub-region functions as a slit and simultaneously the second, third and fourth sub-regions function as barriers, and then the third sub-region operates as a slit and simultaneously the first, second and fourth sub-regions operate as barriers at a same time.

2. The driving circuit system according to claim 1, wherein the driving signals have at least one value of 0V, 7V and 14V.

3. The driving circuit system according to claim 1, wherein the central controlling unit controls the transmission and reception of signals communicating with the external device and the light controlling unit.

4. The driving circuit system according to claim 1, wherein at least one regulator having a voltage level-change circuit part.

5. The driving circuit system according to claim 4, wherein the voltage level-changing circuit part comprises a plurality of resistances and at least one of the plurality of resistances is the variable resistance.

6. The driving circuit system according to claim 4, wherein voltage levels of the driving signals are controlled by the voltage level-changing circuit part.

7. The driving circuit system according to claim 1, wherein the connector unit includes at least one of USB (universal serial bus) port connectors, FPC (flexible printed circuit) cable connectors, and a combination thereof.

8. The driving circuit system according to claim 1, wherein the external device is a personal computer.

9. The driving circuit system according to claim 1, wherein the output signal-controlling unit includes a plurality of MOSFETs (metal-oxide-semiconductor field effect transistors).

10. A driving method of a driving circuit system for a stereoscopic image display device, comprising:
outputting control signals and selection signals from a central controlling unit according to command signals received from an external device;
outputting driving signals from a signal-generating unit which includes at least one regulator having a variable resistance to an output signal-controlling unit based on the control signals;
selectively outputting the driving signals from the output signal-controlling unit to a light controlling unit of the stereoscopic image display device based on the selection signals from the central controlling unit; and
over-driving liquid crystal molecules of the light controlling unit by means of the variable resistance,
wherein the light controlling unit includes a plurality of sub-region groups, each of which includes first, second, third and fourth sub-regions, wherein the step of selecting and outputting the driving signals includes driving the first sub-region as a slit and the second, third and fourth sub-regions as barriers: and then driving the third sub-region as a slit and the first, second and fourth sub-regions as barriers.

11. The driving method according to claim 10, wherein the driving signals have at least one value of 0V, 7V and 14V.

12. The driving method according to claim 10, wherein the driving signals include first, second, and third driving signals, the first driving signal applied to the first sub-region, the second driving signal applied to the second and fourth sub-regions, and the third driving signal applied to the third sub-region.

13. The driving method according to claim 12, wherein the first, second and third driving signals have the same voltage value as a common voltage.

14. The driving method according to claim 13, wherein the image display device displays a two-dimensional image.

15. The driving method according to claim 13, wherein the voltage value is 7V.

16. The driving method according to claim 12, wherein at least one of the first and third driving signals has the same voltage value as a common voltage.

17. The driving method according to claim 16, wherein the sub-region that the at least one of the first and third driving signals is applied to functions as a slit transmitting light.

18. The driving method according to claim 16, wherein the other of the first and third driving signals is an alternating current (AC) voltage alternating between about 0V and about 14V.

19. The driving method according to claim 11, wherein the steps are repeated to display multiple images.

* * * * *